(12) United States Patent
Tada et al.

(10) Patent No.: US 11,105,690 B2
(45) Date of Patent: Aug. 31, 2021

(54) TEMPERATURE TRACEABLE INDICATOR AND ARTICLE QUALITY MANAGEMENT METHOD USING SAME

(71) Applicant: Hitachi, Ltd., Tokyo (JP)

(72) Inventors: Yasuhiko Tada, Tokyo (JP); Tomotoshi Ishida, Tokyo (JP); Hiroshi Sasaki, Tokyo (JP); Kohhei Aida, Tokyo (JP); Masahiro Kawasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 451 days.

(21) Appl. No.: 16/303,417

(22) PCT Filed: Apr. 7, 2017

(86) PCT No.: PCT/JP2017/014483
§ 371 (c)(1),
(2) Date: Nov. 20, 2018

(87) PCT Pub. No.: WO2017/203851
PCT Pub. Date: Nov. 30, 2017

(65) Prior Publication Data
US 2019/0316975 A1 Oct. 17, 2019

(30) Foreign Application Priority Data
May 24, 2016 (JP) .............................. JP2016-102940

(51) Int. Cl.
*G06K 7/14* (2006.01)
*G01K 11/16* (2021.01)
*G01K 3/10* (2006.01)

(52) U.S. Cl.
CPC ................ *G01K 11/16* (2013.01); *G01K 3/10* (2013.01); *G06K 7/1413* (2013.01); *G06K 7/1417* (2013.01)

(58) Field of Classification Search
CPC ........ G01K 11/16; G01K 3/10; G06K 7/1413; G06K 7/1417
(Continued)

(56) References Cited

U.S. PATENT DOCUMENTS

2010/0219235 A1* 9/2010 Nemet ................. G06Q 10/087
235/375
2012/0079980 A1 4/2012 Taylor et al.

FOREIGN PATENT DOCUMENTS

EP 1 055 919 A1 11/2000
JP 61-13116 A 1/1986
(Continued)

OTHER PUBLICATIONS

Machine Translation of JP2004137614 to Kimura, publication date May 13, 2004.*
(Continued)

*Primary Examiner* — Daniel A Hess
(74) *Attorney, Agent, or Firm* — Crowell & Moring LLP (57) ABSTRACT

To address the problem of providing a temperature history indicator capable of specifying a time when a temperature deviated from a set temperature range, a temperature history indicator according to the present invention is characterized in being provided with a substrate and temperature indicators that irreversibly change color upon deviation from a set temperature range, and in that a plurality of the temperature indicators are provided on the substrate, the temperatures at which the temperature indicators change color a within ±2° C. of each other, and the temperature indicators change color after different amounts of time from deviation from the set temperature range.

13 Claims, 8 Drawing Sheets

(58) Field of Classification Search
USPC .......................................... 235/488, 375, 494
See application file for complete search history.

(56) References Cited

FOREIGN PATENT DOCUMENTS

| | | |
|---|---|---|
| JP | 7-244460 A | 9/1995 |
| JP | 2001-194248 A | 7/2001 |
| JP | 2003-315167 A | 11/2003 |
| JP | 2004-137614 A | 5/2004 |

OTHER PUBLICATIONS

International Search Report (PCT/ISA/210) issued in PCT Application No. PCT/JP2017/014483 dated Jul. 11, 2017 with English translation (four (4) pages).
Japanese-language Written Opinion (PCT/ISA/237) issued in PCT Application No. PCT/JP2017/014483 dated Jul. 11, 2017 (four (4) pages).
Extended European Search Report issued in counterpart European Application No. 17802452.7 dated Dec. 3, 2019 (eight (8) pages).

\* cited by examiner

TEMPERATURE TRACEABLE INDICATOR AND ARTICLE QUALITY MANAGEMENT METHOD USING SAME

TECHNICAL FIELD

The present invention relates to a temperature traceable indicator capable of specifying a time of deviating a set temperature range, and an article quality management method using same.

BACKGROUND ART

Perishable foods, frozen foods, and low temperature storage pharmaceuticals such as vaccines, bio pharmaceuticals require cold chains for continuously keeping them at low temperature in a distribution process such as production, transportation, consumption, etc. For continuously measuring and recording temperature during distribution, transportation containers often have data logger capable of continuously recording time and temperature. Mounting of the data logger can make clear where responsibility lies in case if products are damaged.

When the quality of products is managed individually, there is a method of utilizing a temperature indicator instead of the data logger. While the temperature indicator is not as accurate as the data logger in view of recording, since the indicator can be attached to the products individually and the surface is dyed when a temperature goes higher or lower than a predetermined temperature, change of temperature circumstance can be recognized.

Further, in a case of using the temperature indicator, while it is possible to indicate that a deviation from a management temperature in transportation of products from the production site to customers, it cannot define where in the distribution process the management temperature was deviated. Then, a temperature indicator capable of specifying the time upon deviation from the management temperature has been desired.

A patent literature 1 discloses a heating time indication device including a first printing layer formed of a foaming ink, and a second printing layer with a thermo chromic ink formed on the upper surface of the first printing layer, in which the thickness of the first printing layer is changed gradually.

CITATION LIST

Patent Literature

Patent Literature 1: Japanese Unexamined Patent Application Publication No. Hei 7-244460

SUMMARY OF INVENTION

Technical Problem

The heating time indication device disclosed in Patent Literature 1 detects an upper limit temperature. However, since the temperature management range of vaccines, bio pharmaceuticals, etc. is 2 to 8° C., it is necessary to detect both temperature elevation (8° C. or higher) and temperature lowering (2° C. or lower). In a case where the temperature management in a certain temperature range is required as described above, it is expected that both the temperature elevation and the temperature lowering can be detected irreversibly.

Then, the present invention aims to provide a temperature traceable indicator capable of specifying a deviation time from a set temperature range.

Solution to Problem

The temperature traceable indicator according to the present invention includes a substrate, temperature indicators that irreversibly change color when the temperature deviates from a set temperature range, wherein the temperature indicators are arranged in plurality on the substrate, and temperatures at which the temperature indicators change color are within ±2° C. of each other, and the temperature indicator changes color after a different period of time from deviation from the set temperature range.

Advantageous Effects of Invention

According to the present invention, it is possible to provide a temperature traceable indicator capable of specifying a time when the temperature deviates from a set range.

DESCRIPTION OF EMBODIMENTS

A temperature traceable indicator according to an embodiment of the present invention is to be described in details optionally referring to the drawings.

(Basic Configuration of Temperature Traceable Indicator)

Figure 1:
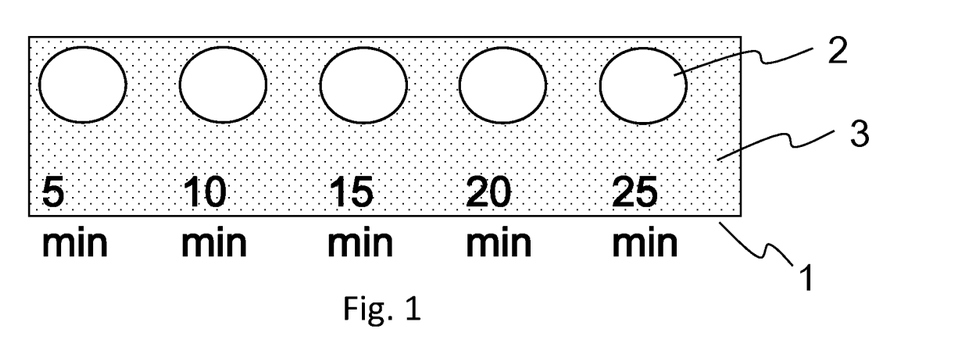
FIG. 1 is a plan view of a temperature traceable indicator according to an embodiment.

FIG. 1 illustrates a plan view of a temperature traceable indicator according to an embodiment. The temperature traceable indicator includes a substrate 1, a plurality of temperature indicators 2 arranged on the substrate. The temperature indicator includes an ink that irreversibly changes color upon deviation from a set temperature range. The color change includes not only the change of hue but also the change of density. A plurality of temperature indicators are common in a set temperature range and the accuracy of the color change temperature thereof is ±2° C. That is, the color change temperature of the temperature indicators is ±2° C. of each other. Further, the time from deviation from the set temperature range to color change is different between each of the temperature indicators. The temperature traceable indicator may include a time indication area 3. In FIG. 1, the time indication area 3 shows the time from the deviation from the set temperature range to color change of the ink contained in the temperature indicator.

Figure 2:
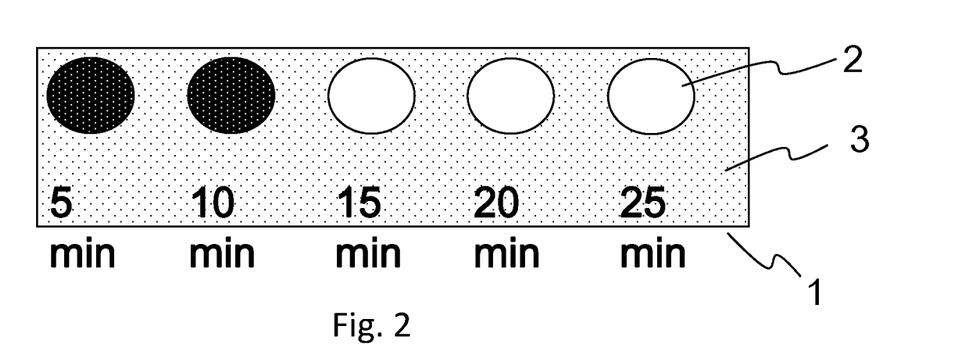
FIG. 2 is a view for explaining the function of the temperature traceable indicator according to FIG. 1.

FIG. 2 illustrates a view for explaining the function of the temperature traceable indicator according to FIG. 1. The temperature traceable indicator does not change color when it is stored in a set temperature range. When the temperature deviates from the set temperature range, the temperature indicators change color. For example, in a case where the color of the temperature indicator corresponding to 5 minutes and 10 minutes change colors as shown in FIG. 2, it can be seen that the time has lapsed more than 10 minutes but not more than 15 minutes after deviation from the set temperature range.

Figure 3:
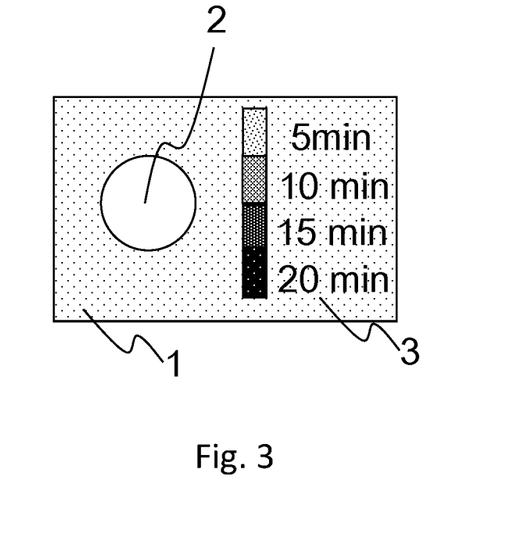
FIG. 3 is a plan view of a temperature traceable indicator according to an embodiment.

While the explanation has been made of a case where the temperature indicators are provided at plural positions on the substrate, temperature indicators may be disposed being overlapped each other at an identical position on the substrate. FIG. 3 shows a temperature traceable indicator in which temperature indicators overlap each other. A plurality of temperature indicators are arranged overlapping each other on the substrate 1. In such a configuration, it is necessary to change the color after color change for each of the temperature indicators. When the correlation between the color of the temperature indicator after color change and the temperature deviation time is known, presence or absence of the temperature deviation and the temperature deviation time can be recognized based on the color of the temperature indicator. Accordingly, it is preferable to provide a time indication area 3 showing the correspondence between the temperature deviation time and the color of the temperature indicator after color change on the substrate.

Figure 4:
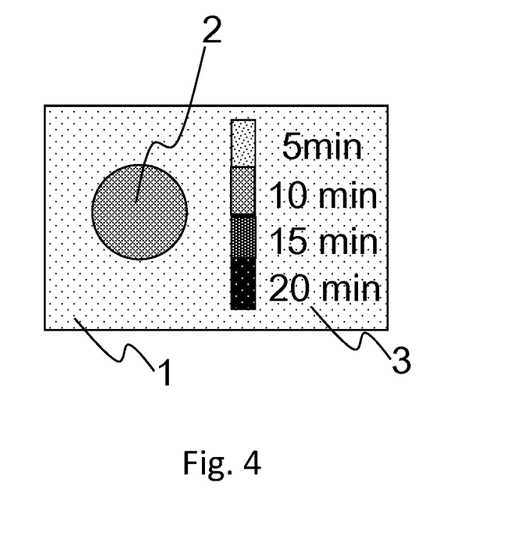
FIG. 4 is a view for explaining the function of the temperature traceable indicator according to FIG. 3.

FIG. 4 illustrates a view for explaining the function of the temperature traceable indicator according to FIG. 3. In the temperature traceable indicator according to FIG. 4, the color of the temperature indicator changes to a color shows lapse of 10 minutes. Accordingly, it can be seen that 10 minutes or more has lapsed after deviation from the set temperature range. Further, it can be seen that 15 minutes has not yet passed by using an ink showing a denser color after color change as the temperature indicator showing longer time till color change after temperature deviation.

Figure 5:
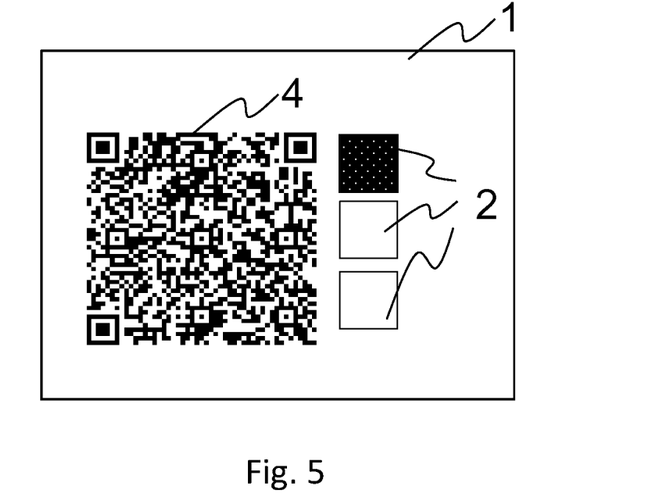
FIG. 5 is a plan view of the temperature traceable indicator according to the embodiment.

The temperature traceable indicator may have a 1-dimensional code or a 2-dimensional code on the substrate. FIG. 5 shows a temperature traceable indicator having a 2-dimensional code 4. The code includes various standards in addition to the difference of dimensions, but the present invention does not depend on such standards. The 1-dimensional code, and the 2-dimensional code include information, for example, of an article such as product ID, production date, etc. Use of the temperature traceable indicator having a 1-dimensional code or 2-dimensional code containing the article information, article (commodity) and temperature management can be linked.

Further, the 1-dimensional code or the 2-dimensional code preferably has information for the number of temperature indicators, positions, set temperature ranges, and times from deviation from the set temperature range to color change.

Figure 6:
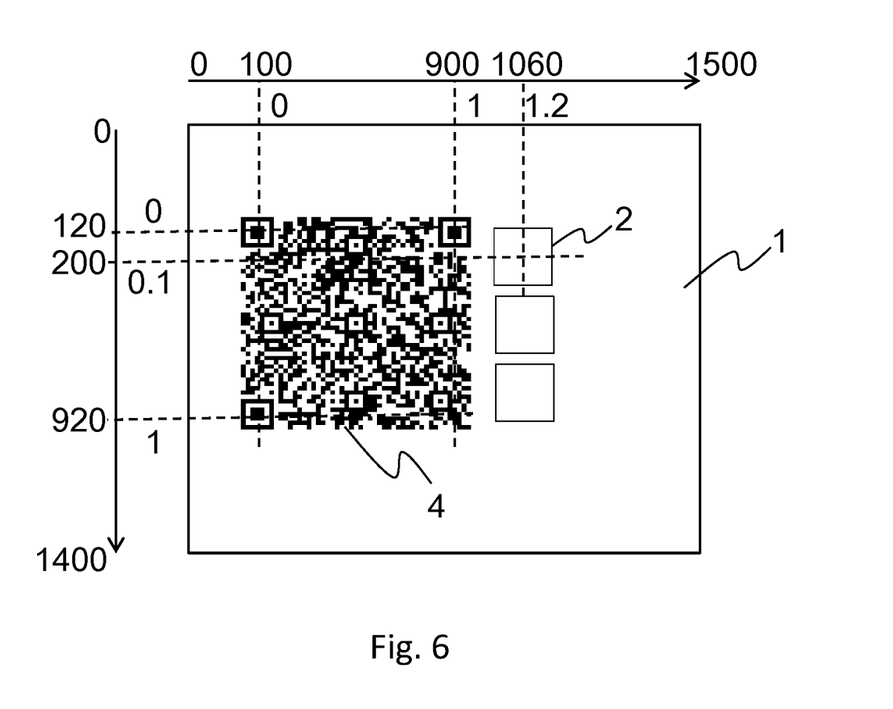
FIG. 6 is a view for explaining a method of reading a temperature traceable indicator according to FIG. 6.

In a case of adding numbers, positions, set temperature ranges, times for color change of the temperature indicators in terms of the character string to the code representing the commodity in the character string, the character string includes, for example, "1234567: count=3; temperature 10, 5 min, 1.2, 0.1; temperature 10, 10 min, 1.2, 0.2: temperature 10, 15 min, 1.2, 0.3". "1234567" is a commodity representing code and a customary code is used as it is. "count=3" represents that three types of temperature indicators are present. "temperature 10, 5 min, 1.2, 0.1" represents that a temperature indicators indicating color change at a temperature of 10° C. and color change time of 5 minutes are present at positions in 1.2 in the lateral direction and 0.1 in the longitudinal direction. While the position can be expressed by an actual length, for example, mm, this is preferably represented by a relative position utilizing the reference position of the code. FIG. 6 illustrates a drawing for explaining a relative position of a temperature indicator utilizing the reference position of the code. In FIG. 6, a coordination system is set with the reference point at the upper left of the 2-dimensional code 4 being defined as an original point, and setting a reference point at the upper right as a lateral direction 1, and the reference point at the lower left as a longitudinal direction 1, and the central position for each of the temperature indicators is represented by the coordination system. By utilizing the method, the data can be read when the temperature indicators are arranged on arbitrary positions.

The beginning part of the string contains only the commodity code in the example described above, but this may also be a character string, for example, URL accessing a particular site, for example, "http://www.***.com/code,aspx?ID=1234567;count=3;temperature 10,5 min, 1.2,0.1; temperature 10.10 min,1.2,0.2; temperature 10,15 min,1.2, 0.3".

In the temperature traceable indicator having the 1-dimensional code or the 2-dimensional code data is read in the process, for example, production, distribution, consumption, etc. by a reading device based on the operation of a person dealing with the commodity, and the data is stored or transmitted. First, a character string of the 1-dimensional code or the 2-dimensional code is read and data on the commodity code and the temperature indicator is extracted from the character string. Then, the color data of the temperature indicator is read, and the commodity code and the color data are recorded in the memory and transmitted. The data transmitted from a plurality of reading devices is collected and recorded.

With respect to the positional relation between the 1-dimensional code or the 2-dimensional code and the temperature indicator, they are preferably arranged so as to be easily taken simultaneously as images upon data reading.

(Substrate)

For the substrate, it is only necessary that the close contact is kept between the temperature traceable indicator and the substrate. For example, plastic film materials such as polyester films, polyethylene terephthalate (PET) films, and vinyl chloride, etc., and paper materials such as wood free paper, Kraft paper, Japanese paper, etc. can be used.

Further, the substrate preferably has, at the rear face, a pressure-sensitive adhesive layer and a film capable of being released from the pressure sensitive adhesive layer (releasable film). The pressure sensitive adhesive layer facilitates attachment of the temperature traceable indicator to an object for temperature management.

(Temperature Indicator)

Any temperature indicator that irreversibly changes color upon deviation from a set temperature range may be used. The material irreversibly changes color when any of the upper limit temperature or the lower limit temperature of the set temperature range is deviated. There is no particular restriction on the configuration of the temperature indicator.

Figure 7:
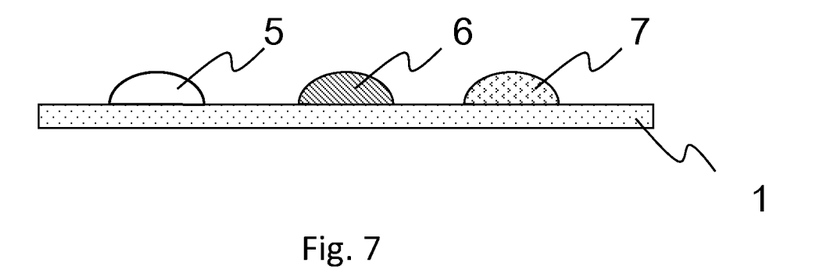
FIG. 7 is a cross sectional view of a temperature traceable indicator according to an embodiment.

For the temperature indicator, a thermo chromic ink can be used. The thermo chromic ink is an ink that changes color by detecting temperature. The time from the deviation from the set temperature range to color change can be adjusted, for example, by changing the type of the ink of each temperature indicator. FIG. 7 illustrates a cross sectional view of a temperature traceable indicator according to an embodiment. The time from deviation from the set temperature range to color change is adjustable by using inks 5, 6, 7 as the temperature indicators respectively. For example, in a case of using an ink containing a leuco dye, a color developer, and a decolorizer, the time from the deviation from the set temperature range to the color change of the ink contained in the temperature indicator can be adjusted depending on the type of the decolorizer or the amount of additives added to the ink.

Figure 8:
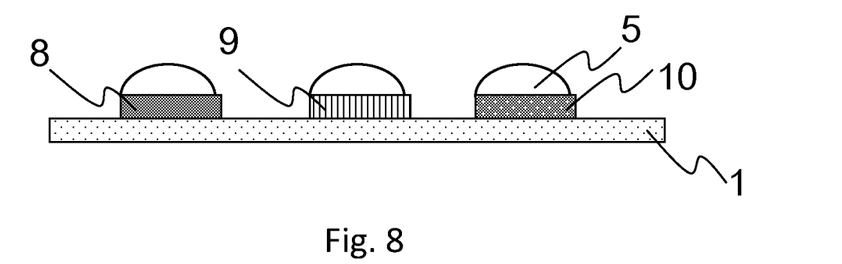
FIG. 8 is a cross sectional view of a temperature traceable indicator according to an embodiment.

The temperature indicator may also include a thermo chromic ink and a thermoconductive layer. FIG. 8 illustrates a cross sectional view of a temperature traceable indicator having a thermoconductive layer. Each of the thermoconductive layers 8, 9, 10 is disposed between the temperature indicators 5 and the substrate 1. While the identical thermo chromic ink is used in all of the temperature indicators, the thermal conductivities of the thermoconductive layers 8, 9, 10, are different respectively. When thermoconductive layers of different thermal conductivities are disposed between the thermo chromic ink and the substrate, the time from deviation from the set temperature range to color change can be controlled in each of the thermo chromic inks.

Figure 9:
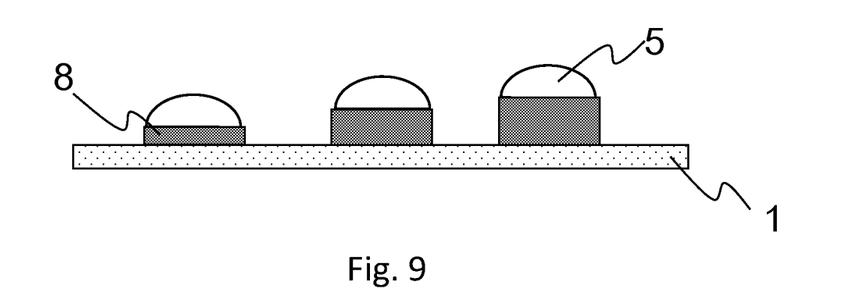
FIG. 9 is a cross sectional view of a temperature traceable indicator according to an embodiment.

The time from the deviation from the set temperature range to color change may also be adjusted by changing the thickness of the thermoconductive layer. FIG. 9 shows a cross sectional view of a temperature traceable indicator in which the thickness of the thermoconductive layer is changed. As shown in FIG. 9, identical materials are used for the thermo chromic ink 5 and the thermoconductive layer 8 in each of the temperature indicators, but the thickness of the thermoconductive layer is made different. As the thickness of the thermoconductive layer is larger, the time from the deviation from the set temperature range to color change is longer.

The thermo chromic ink includes a first ink in which a temperature $T_{a1}$ initiating decolorization upon temperature elevation and temperature $T_{d1}$ initiating color development upon temperature lowering are different, and a second ink in which a temperature $T_{a2}$ initiating decolorization upon temperature elevation and a temperature $T_{d2}$ initiating color development upon temperature lowering are different, and those having a relation between decolorization and color development initiation temperature as: $T_{d1}<T_{d2}<T_{a1}<T_{a2}$ are used preferably. Further, for the temperature T at the initial stage of the temperature traceable indicator (state before temperature detection), it is preferable to satisfy the relation between the initial temperature T, the first ink decolorization temperature $T_{a1}$, and the second ink color development initiation temperature $T_{d2}$ preferably satisfy the relation: $T_{d2}<T<T_{a1}$.

Figure 10:
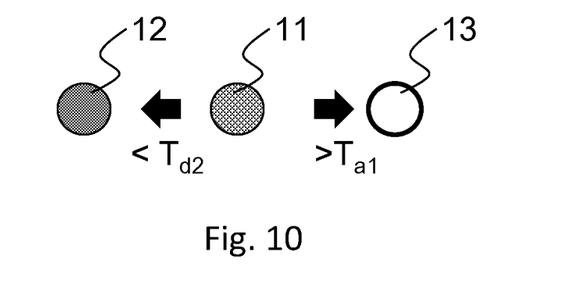
FIG. 10 is a view for explaining the function of an ink used for a temperature traceable indicator according to an embodiment.

The function of the ink is to be described with reference to FIG. 10. The ink according to FIG. 10 is formed by printing the first ink and the second ink to an identical position on the substrate, etc. In the initial state 11 (from the color development initiation temperature $T_{d2}$ of the second ink to the decoloring initiation temperature $T_{a1}$ of the first ink), the ink shows the color of the developed first ink. The ink 11 in the initial state shows the color 12 derived from the color of the developed first ink and the color of the developed second ink when the temperature lowers to $T_{d2}$ or lower. Further, the ink 11 in the initial state changes to the color 13 derived from the color of the decolorized first ink and the color of the decolorized second ink as the temperature is at or higher than $T_{a1}$.

Figure 11:
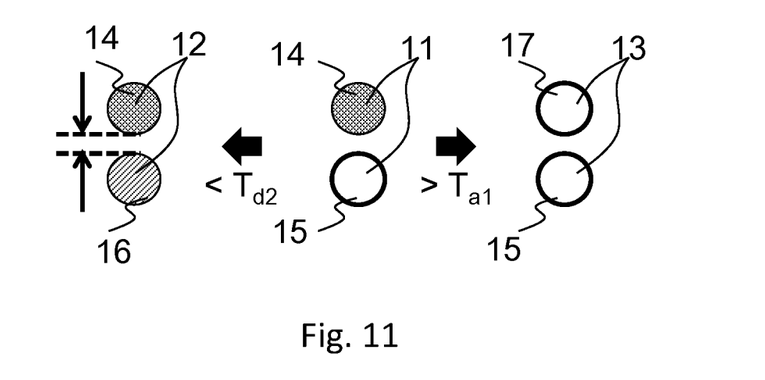
FIG. 11 is a view for explaining the function of an ink used for a temperature traceable indicator according to an embodiment.
Figure 12:
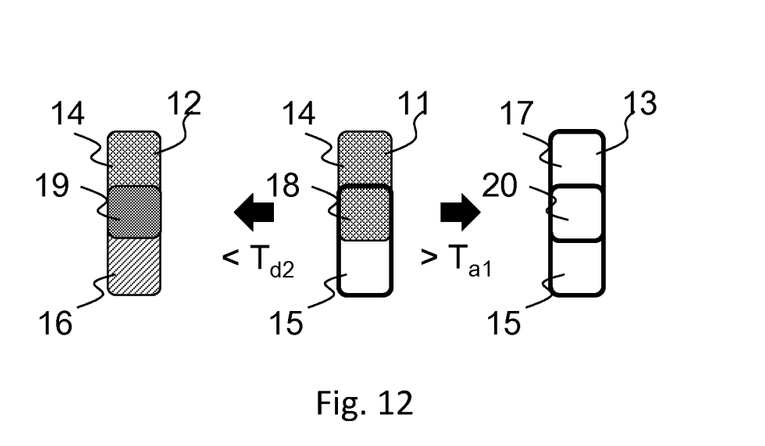
FIG. 12 is a view for explaining the function of an ink used for a temperature traceable indicator according to an embodiment.

The printed first ink and the second ink may also be arranged at a distance between the terminal ends of the printed matter as shown in FIG. 11, or may be printed so as to partially overlap as shown in FIG. 12.

In FIG. 11, the initial state 11 includes the color developed first ink 14 and the decolorized second ink 15. The ink 11 in the initial state is a combination of the color developed first ink 14 and the color developed second ink 16 when the temperature lowers to $T_{d2}$ or lower. Further, the ink 11 in the initial state includes a combination of the decolorized first ink 17 and the decolorized second ink 15 when the temperature rises to $T_{a1}$ or higher.

Referring to FIG. 12, in the initial state 11, the overlapped portions 18, 19, 20 of the first ink and the second ink change in the same manner as in FIG. 10. Those portions where the first ink and the second ink are not overlapped change in the same manner as in FIG. 11.

Figure 13A:
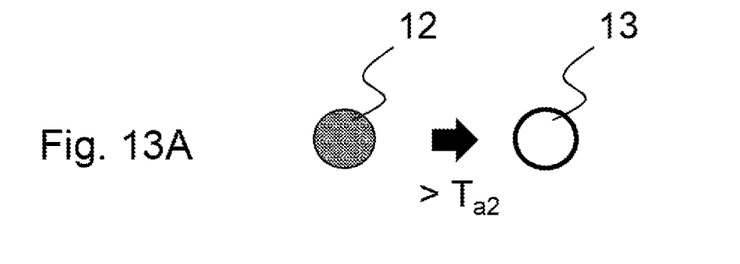
FIGS. 13A and 13B are views for explaining the function of faking prevention according to FIG. 10.
Figure 13B:
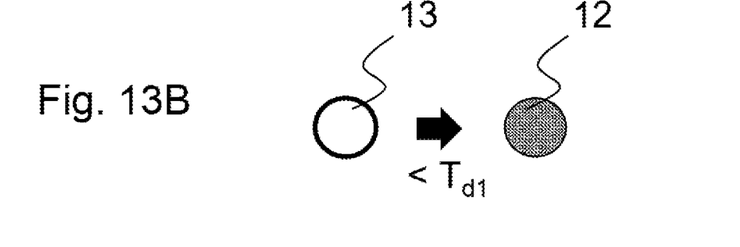

The tamper preventing function of the thermo chromic ink according to FIG. 10 is to be described with reference to FIG. 13. For returning to the initial state 11 from the color changed state 12 due to lowering of the temperature from the initial state 11 to $T_{d2}$ or lower, it is necessary to decolorize the second ink. Since the decoloring initiation temperatures of the first ink and the second ink are in a relation of $T_{a2}>T_{a1}$, it is difficult to decolorize only the second ink. If the temperature is changed to $T_{a2}$ or higher, this results in a state 13 where both of the first ink and the second ink are decolorized as shown in FIG. 13(a), which cannot be returned to the initial state 11. Further, for returning to the initial state 11 from the state 13 due to elevation of temperature from the initial state to $T_{a1}$ or higher, it is necessary to allow the first ink to develop a color. Since the color development initiation temperatures of the first ink and that of the second ink are in a relation of $T_{d1}<T_{d2}$, it is difficult to allow only the first ink to develop a color. If the temperature is changed to $T_{d2}$ or lower, both of the first ink and the second ink show color developed state 12 as shown in FIG. 13(b) and cannot be returned to the initial state 11.

Figure 14A:
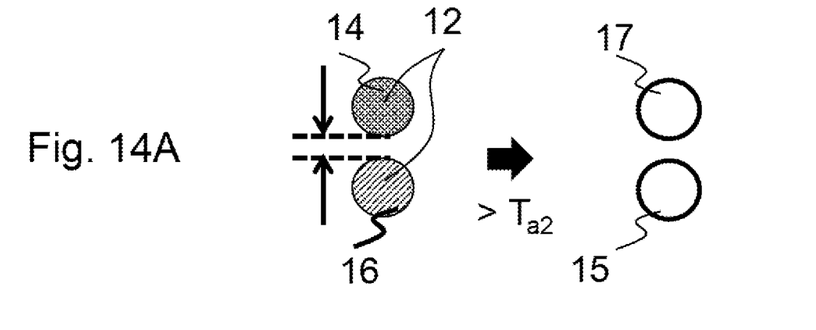
FIGS. 14A and 14B are views for explaining the faking prevention function of an ink according to FIG. 11.
Figure 14B:
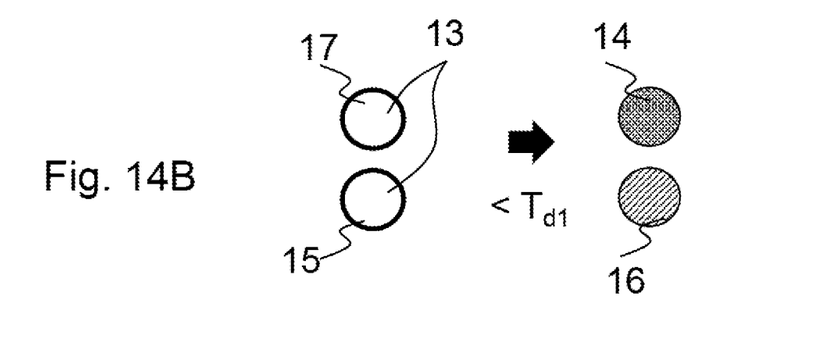

The temperature traceable indicator according to FIG. 11 can be explained in a same manner. For return to the initial state 11 from the state 12 in which color is changed by lowering of the temperature to $T_{d2}$ or lower, it is necessary to decolorize the second ink. If the temperature is changed to $T_{a2}$ or higher in order to decolorize the second ink, both of the first ink and the second ink are in a decolorized state as shown in FIG. 14(a). Further, in order to return to the initial state 11 from the color changed state 13 due to temperature elevation to $T_{a1}$ or higher, it is necessary to allow the first ink to develop color. If temperature is changed to $T_{d2}$ or lower intending to develop color of the first ink, both of the first ink and the second ink are in the color developed state as shown in FIG. 14(b) and it is impossible to return them to the initial state 11. Further, for tamper prevention, the printing distance between the first ink and the second ink is preferably smaller than the size of the printed matter and it is preferable that they are disposed at a distance within 1 to 10% relative to the size of the printed matter of the first ink or the second ink.

As has been described above, tamper prevention is possible by using the first ink and the second ink having a relation: $T_{d1}<T_{d2}<T_{a1}<T_{a2}$, and setting the state where the first ink is color developed and the second ink is decolorized to the initial state.

(First Ink and Second Ink)

Figure 15A:
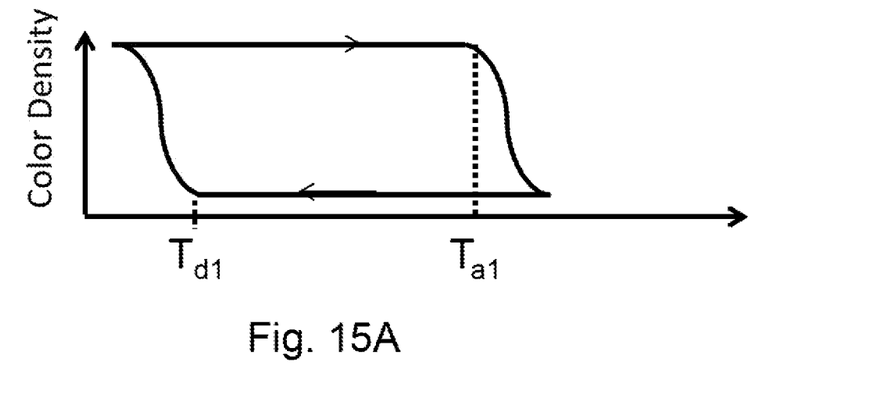
FIGS. 15A and 15B are schematic views illustrating the color density change of an ink relative to the temperature of the first ink and the second ink.
Figure 15B:
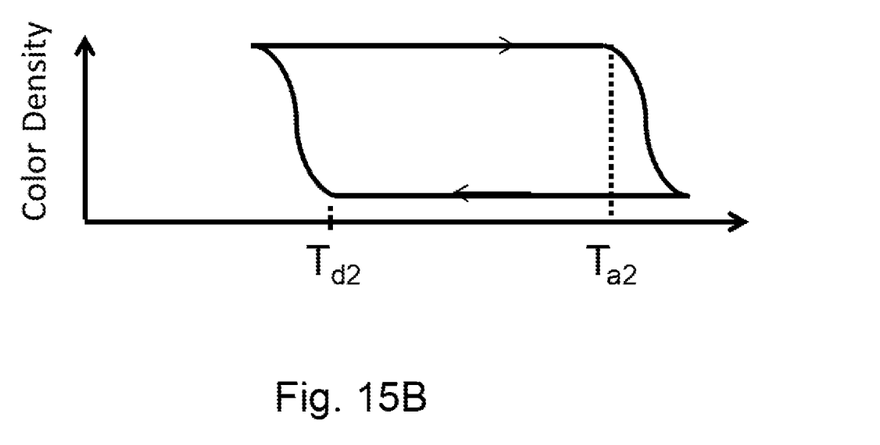

As the first ink and the second ink, inks having different decoloring initiation temperature and color development initiation temperature can be used. Reversible color change accompanying temperature change of the first and the second inks can be shown in FIGS. 15(a) and 15(b) respectively. In FIG. 15, temperature is expressed on the abscissa and the color density is expressed on the ordinate. For example, the first ink shown in FIG. 15(a) lowers the color density when temperature reaches $T_{a1}$ during temperature elevation and changes to a state where the color density is lowest (decolorization state). Further, when the ink in a decolorized state is cooled, it keeps a decolorized state till $T_{d1}$; however, the color density increases to change the state to the color developed state after reaching $T_{d1}$. The first ink in the color developed state keeps the color developed state unless temperature elevates beyond $T_{a1}$. This is identical for the second ink, which changes the color developed state and the decolorized state respectively at the temperatures of $T_{d2}$ and $T_{a1}$. Such a reversible color change cycle is generally known as a hysteresis color change phenomenon.

The first ink and the second ink utilize respective hysteresis color change phenomena and the temperature changing to color development and decolorization are in a relation of $T_{d1}<T_{d2}<T_{a1}<T_{a2}$. Further, when used as a temperature traceable indicator, it is desired that one of the first ink or the second ink is in a color developed state within a temperature detection range and the other of them is in a decolorized state respectively.

As the material showing such hysteresis color change phenomenon, compositions comprising leuco dyes as electron donating compounds, color develop as electron acceptable compounds, and decolorizer for controlling the temperature range of the hysteresis are desirable. The leuco dyes are usually colorless or exhibit pale colors and develop a color in contact with a color developer. The decolorizer can decolorize the developed leuco dye when heated excessively in the coexistence of the leuco dye and the color developer. The temperature range of the hysteresis greatly depends on the melting point and the coagulation point of the decolorizer.

(Leuco Dye)

The leuco dyes comprise electron-donating compounds, for which those known so far as dyes for pressure sensitive reproducing sheet or dyes for thermosensitive recording sheet can be utilized. They include, for example, triphenylmethane phthalides, fluorans, phenothiazine, indolylphthalides, leucoauramines, spiropyrans, rhodamine lactams, triphenylmethanes, triazenes, spiro phthalane xanthenes, naphtho lactams, and azomethines. Specific examples of such leuco dye include 9-(N-ethyl-N-isopentylamino)spiro[benzo][a]xanthene-12,3'-phthalide, 2-methyl-6-(N-p-tolyl-N-ethylamono)-fluoran-6-(diethylamino)-2-[(3-trifluoromethyl)anylino]xantene-9-spiro-3'-phthalide, 3,3-bis(p-diethylaminophenyl)-6-dimethylaminophthalide, 2'-anilino-6'-(dibutylamino)-3'-methylspiro[phthalide-3,9'-xanthene], 3-(4-diethylamino-2-methylphenyl)-3-(1-ethyl-2-methylindole-3-yl)-4-azaphthalide, 1-ethyl-8-[N-ethyl-N-(4-methylphenyl)amino]-2,2,4-trimethyl-1,2-dihydrospiro[11H-chromeno[2,3-g]quinoline-11, and 3'-phthalide. As shown in FIGS. 1 and 3 to 5, in the temperature traceable indicator printed with the first ink and the second ink in overlap, use of a dye developing a color particularly other than black is used preferably with a viewpoint of visibility and, further, the first ink and the second ink more preferably exhibit different colors. Specifically, 9-(N-ethyl-N-isopehtylamino)spiro[benzo[a]xanthene-12,3'-phthalide] is preferable as the leuco dye for the first ink and 3-(4-diethylamino-2-methylphenyl)-3-(1-ethyl-2-methylindole-3-yl)-4-azaphthalide is preferable as the leuco dye for the second ink. Combination of the first ink and the second ink is not limited to them but any of those exhibiting different colors may be used.

Further, one or two or more of leuco dyes can be used in combination for the first ink and the second ink.

(Color Developer)

The color developer as the electron donator can change the structure of the leuco dye to develop color when in contact with the electron donating leuco dye. As the color developer, those known so far as the color developer used for thermosensitive recording sheet or pressure sensitive copying sheet, etc. can be utilized. Specific examples of such color developer include phenols such as 4-hydroxy benzyl benzoate, 2,2'-biphenol, 1,1-bis(3-cyclohexyl-4-hydroxyphenyl)cyclohexane, 2,2-bis(3-cyclohexyl-4-hydroxyphenyl)propane, bisphenol A, bisphenol F, bis(4-hydroxyphenyl)sulfide, paraoxybenzoate ester, and gallate esters. The color developer is not limited to them but compounds which are electron donating compounds and can change color of leuco dyes can be used. Further, metal salts of carboxylic acid derivatives, salicylic acid and metal salicylate, sulfonic acids, sulfonates, phosphoric acids, metal phosphates, hydrogen phosphates, hydrogen metal phosphates, phosphites, metal phosphites, etc. may also be used. Particularly, those highly soluble with leuco dyes and decolorizers to be described later are preferable, and organic colorant such as 2,2'-bisphenol, bisphenol A, gallate, etc. are preferable.

The color developers may be used alone or two or more of them may be combined and, further, the color density of the leuco dye upon color development can be adjusted by combination. The amount of the color developer used is selected depending on a desired color density. For example, it may be selected within a range of about 0.1 to 100 parts by weight based on one part by way of the leuco dye.

(Decolorizer)

The decolorizer is a compound capable of dissociating the bonding between a leuco dye and a color developer, which is a compound capable of controlling the color development temperature of the leuco dye and the color developer. Generally, in a temperature range where a leuco dye develops a color, the decolorizer is solidified in a phase-separated state. Further, in a temperature range where the leuco dye is in a decolorized state, the decolorizer is melted in a state where the function of dissociating the bonding between the leuco dye and the color developer is provided. The color development temperature and the decolorization temperatures of the leuco dye used for the ink of the present invention depend on the freezing point and the melting point of the decolorizer. Accordingly, it is preferable that there is a temperature difference between the freezing point and the melting point of the decolorizer. Further, the temperature of the melting point or the freezing point depends on the range of the temperature management as a target. Specifically, there are fatty acid ester compounds such as dimethyl succinate, dimethyl sebacate, isopropyl myristate, isopropyl palmitate, tricaprylin, tricaprin, trilaurin, and trimyristin, and such compounds are preferably contained with a viewpoint of compatibility with the leuco dye and the color developer. Further, for the adjustment of the freezing point, melting point, and the decolorization time, one or more of such decolorizers may be used, or they may be combined with hydrocarbons such as paraffin and liquid paraffin. Naturally, it is not restricted only to such compounds but includes, for example, other esters, alcohols, ethers, ketones, amides, azomethines, fatty acids, hydrocarbon, etc.

(Microencapsulation of First Ink and Second Ink)

While the ink containing the leuco dye, color developer, and the decolorizer can be used by being dispersed uniformly in inks, coating materials, synthetic resins, etc. in the same manner as usual dyes or pigments, they are preferably included independently in terms of microcapsules including resin membranes with a viewpoint of storage stability. Particularly, as shown in FIG. 1, where the first ink and the second ink are used and printed on an identical position, they are desirably microencapsulated such that the leuco dye, the color developer, and the decolorizer of the first ink and the second ink are not mixed. Microencapsulation can improve the resistance to circumstance of the composition such as moisture or the like as described above thereby enabling storage stability, color change stability, etc. In addition, the microencapsulation can also suppress the effects on the leuco dye, the color developer and the decolorizer undergoing from other compounds such as resin agents, additives, etc. upon preparation into the ink or the coating material.

Known various methods are applicable for microencapsulation. They include, for example, emulsion polymerization, suspension polymerization, coacervation, interfacial polymerization, spray drying, etc., but not limited to them. Further, two or more different methods may be combined.

The resin membranes used for the microencapsulation include membranes of urea resins comprising polyvalent amines and carbonyl compounds, membranes of melamine resins comprising melamine formalin prepolymers, methylol melamine prepolymers, methylated melamine prepolymers, membranes of urethane resins comprising polyvalent isocyanates and polyol compounds, membranes of amide resins comprising polybasic acid chlorides and polyvalent amines, and membranes of vinylic resins comprising various monomers such as vinyl acetate, styrene, (meth)acrylate, acrylonitrile, and vinyl chloride, but not limited to them. Further, additional treatment may also be applied, for example, applying surface treatment to the formed resin membranes to adjust the surface energy upon preparation of an ink or coating material, thereby improving the dispersion stability of the microcapsule.

Further, in view of subjects such as device adaptability, storage stability, etc., the diameter of the microcapsules is preferably within a range of about 0.1 to 100 μm and, more preferably, in a range from 0.1 to 1 μm.

(Ink Solution)

In a case of printing the first ink and the second ink by using a charge controlled ink jet printer, a first ink solution and a second ink solution prepared by dispersing the first ink and the second ink into solvents are necessary. The ink solution contains resins, colorants, additives having polydimethyl siloxane chains, additives having alkoxy silane groups, solvents, etc. and an ink is formed by stirring such materials by means of an overhead stirrer, etc. thereby compatibilizing or dispersing them to each other. In a case where the ink is highly resistant, a conductive agent to be described later is also added.

Further, a conductive agent is preferably added to the ink solution. In a case where the ink solution is highly resistant, ink particles do not fly linearly but tend to curve in the ink discharge portion of the charge controlled ink jet printer. Accordingly, it is necessary to restrict the resistance to about to 2000 Ωcm or lower. The ink composition mainly comprises an organic solvent comprising 2-butanone or ethanol as a main component, a resin and a pigment. Since they are less electroconductive, if the ink consists only of them, the resistance is as high as about 5000 to several tens hundred Ωcm and desired printing is difficult by the charge controlled ink jet printer. As the electroconductive agent, a complex compound is used preferably and it is necessary that the electroconductive agent is soluble to the solvent used and it is also important that the agent gives no effect on the color tone. Further, the electroconductive agent of a salt structure is used generally. It is supposed that charges are localized in a molecule, and accordingly, high electroconductivity can be provided. Since a material with no salt structure cannot lower the resistance to 2000 Ωcm or less unless the material is added by a considerable amount, it is not appropriate to add such material to the ink of the present invention.

As a result of investigation with a viewpoint described above, it has been found preferable that the electroconductive agent preferably has a salt structure in which a cation suitably has a tetraalkyl ammonium ion structure. Alkyl chain may be either linear or branched and the solubility to the solvent is improved more as the number of carbon atoms is larger. However, as the number of carbon atoms is smaller, resistance can be lowered by a lesser addition ratio. A number of carbon atoms in the case for the ink is actually about 2 to 8.

The anions are preferably hexafluoro phosphate ions, tetrafluoro borate ions, etc. in view of high solubility to the solvent.

While perchlorate ions also show high solubility, since they are detonative, use of them for the ink is not practical. While chlorine, bromine, and iodine ions may also be considered, since they corrode metals such as iron or stainless steel when in contact with them, they are not preferable.

In view of the above, preferable conductive agents include, for example, tetraethylammonium hexafluoro phosphate, tetraprolylammonium hexafluoro phosphate, tetrabutylammonium hexafluoro phosphate, tetrapentylammonium hexafluoro phosphate, tetrahexylammonium hexafluoro phosphate, tetraoctylammonium hexafluoro phosphate, tetraethylammonium tetrafluoro borate, tetrapropylammonium tetrafluoro borate, tetrabutylammonium tetrafluoro borate, tetrapentylammonium tetrafluoro borate, tetrahexylammonium tetrafluoro borate, and tetraoctylammonium tetrafluoro borate.

In a case of using an ink containing a leuco dye, a color developer, and a decolorizer, the time from deviation from the set temperature range to color change of an ink contained in the temperature indicator can be adjusted by changing the type of the decolorizer.

(Quality Management Method Using Temperature Traceable Indicator)

Figure 16:
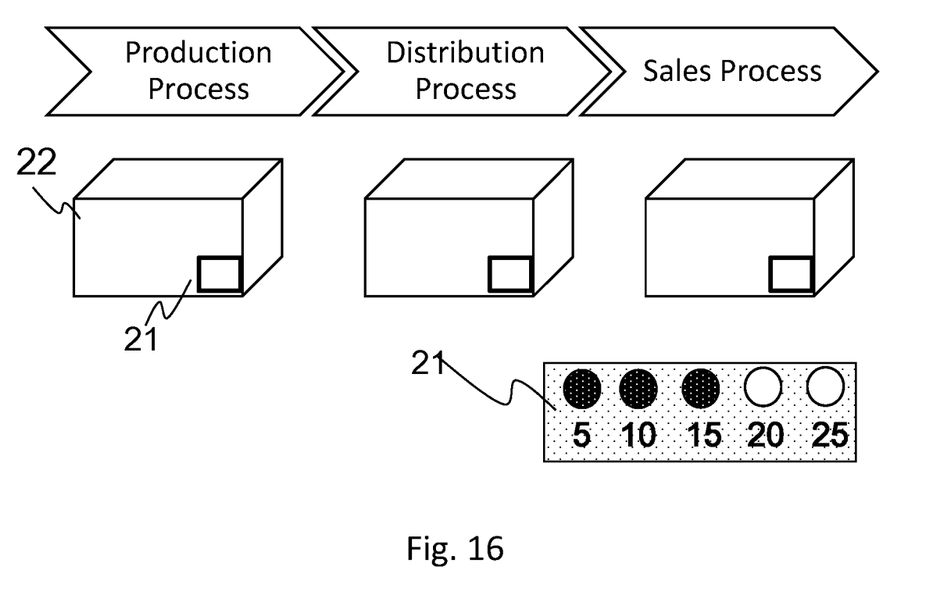
FIG. 16 is a view illustrating an application example of the temperature traceable indicator.

An example of an application method of the temperature traceable indicator according to an embodiment is to be explained with reference to FIG. 16. FIG. 16 illustrates a scheme in which a commodity is delivered by way of a production process, a distribution process, and a sales process to a customer. A temperature traceable indicator 21 is attached to a commodity 22, a package of the commodity, etc. The commodity as a target of temperature management includes, for example, foods, drinks, pharmaceuticals, etc.

In a case where the temperature traceable indicator is in a state as shown in FIG. 16 upon delivery of commodities from a distribution tracer to a sailing trader, it can be seen that the set temperature range has not been deviated 20 minutes before the confirmation of the temperature traceable indicator but a time of 10 minutes or more has been lapsed from the deviation from the set temperature range. When the necessary time for each of the processes is known, it can be specified a trader or a process in which the set temperature range has been deviated.

The time from the deviation from the set temperature range to the color change in the temperature indicator used for the temperature traceable indicator is preferably set so as to correspond to each of the process of the article distribution. By adjusting the time from the deviation from the set temperature range to the color change, it can be judged whether the set temperature has been deviated or not in each of the processes on the basis of the presence or absence of the color change of the temperature indicator.

In FIG. 16, while presence or absence of the color change in the temperature indicator of the temperature traceable indicator is confirmed upon delivery of the commodity from the distribution trader to the sales trader, the color change of the temperature indicator of the temperature traceable indicator may also be confirmed at any timing such as delivery of the commodity from the manufacture to the delivery trader or commodity delivery between delivery traders in a case where the commodities are delivered by way of a plurality of delivery traders.

Further, in a case of using a temperature traceable indicator having the 1-dimensional code or the 2-dimensional code as shown in FIG. 5, absence or presence of the color change in a temperature indicator may be recognized by reading the 1-dimensional code or the 2-dimensional code by a reading device and based on the read data on the temperature indicator obtained from the read code.

While the color change of the temperature indicator can be confirmed with naked eyes, the color change may be recognized mechanically by taking in the same by a camera as image data or color gradation data.

(Manufacturing Method of Temperature Traceable Indicator)

As a method of forming a temperature hysteresis indicator, a temperature indicator may be printed on a substrate or a thermoconductive layer by using, for example, a charge controlled ink jet printer, a large character ink jet printer (DOD type industrial ink jet printer), screen printing, a dispenser, etc. With a viewpoint of adaptability to mass products such as foods and pharmaceuticals, a method of using the charge controlled ink jet printer is preferable. By the use of the charge controlled ink jet printer, printing time and cost can be saved. Further, since printing is performed by flying an ink in the charge controlled ink jet printer, printing is possible even at a distance as far as several tens mm from a printed matter and printing is possible corresponding to various packages and configurations. In a case of printing by using the charge controlled ink jet printer, the size of the printed matter is 0.1 mm or more and 1 mm or less.

EXAMPLE

Then, the present invention is to be explained more specifically with reference to examples and comparative examples. The present invention is not limited to such examples.

(Preparation of Temperature Traceable Indicator)

A first ink and a second ink as temperature indicators were prepared as described below. For the first ink, 1 part by weight of 2'-methyl-6'-(N-p-tolyl-N-ethylamino)spiro [isobenzofuran-1(3H), 9'-[ 9H]xanthene]-3-on (RED520 manufactured by Yamada Chemical Industry Co., Ltd.) as was used a leuco dye, 1 part by weight of octyl gallate manufactured by Tokyo Chemical Industry Co., Ltd. was used as a color developer, and 100 parts by weight of a mixture of a dimethyl succinate were used as a matrix with addition of 2-phenylethyl phenyl acetate as a decolorizer.

As the decolorizer, five types of paraffin to dimethyl succinate at a weight ratio of paraffin (weight)/dimethyl succinate (weight)=0, 0.05, 0.1, 0.15, and 0.2 were used. A first ink was prepared by using five types of decolorizers.

As a second ink, 1 part by weight of 3,3-bis(p-dimethylaminophenyl)-6-dimethylaminophthalide (CVL manufactured by Yamada Chemical Industry Co., Ltd.) was used as a leuco dye, 1 part by weight of ethyl gallate manufactured by Tokyo Chemical Industry Co., Ltd. was used as a color developer, and 100 parts by weight of a mixture comprising dimethyl sebacate as a matrix with addition of paraffin were used as a decolorizer.

For the decolorizer, five types of paraffin to dimethyl succinate at paraffin (weight)/dimethyl succinate (weight)= 0, 0.25, 0.5, 0.75, 1.0 weight ratio were used. A second ink was prepared by using the five types of the decolorizers.

The first ink and the second ink were microencapsulated respectively by pouring an oil phase prepared by dissolving a leuco dye, a color developer and a decolorizer constituting the first ink and the second ink respectively, 2,2'-azobis (isobutyronitrile) as a polymerization initiator, and styrene constituting resin membranes in a 2-ethylhexyl acrylate into an aqueous phase with addition of sorbitan fatty acid ester as a surface active agent and a sodium salt and stirring by a stirrer.

As ink solution containing a first ink or a second ink was prepared respectively by pouring 2-butanone, a copolymer of polyvinyl alcohol and polyvinyl acetate at a number average molecular weight (Mn) of 10,000 as a resin (number of repetition of polyvinyl alcohol:number of repetition of polyvinyl acetate=36:64 and hydroxy value of 285), and microencapsulated first or second ink was charged in a container equipped with stirring blades and mixed for about one hour.

The thus prepared ink solution was filled in an ink jet printer (Gravis RX-HD261J) manufactured by Hitachi Industrial Equipment Systems Co., Ltd. and printed on a PET film under an atmosphere at a temperature of 5±3° C., so as to form a temperature traceable indicator shown in FIG. 1. The ink solution containing the first ink was previously cooled to 2° C. or lower and printed in a color developed state. Further, the ink solution containing the second ink was previously heated to 8° C. or higher and printed in a decolorized state. Thus, 5 types of temperature indicators were formed on the PET film.

(Confirmation of Display Function of Temperature Traceable Indicator)

When the prepared temperature traceable indicator was put in a circumstance at 2° C. or lower, it could be confirmed that each of the temperature indicators changed color at 1, 2, 3, 4, 5 minutes. In the same manner, when the prepared temperature traceable indicators was put in a circumstance at 8° C. or higher, it could be confirmed that each of the temperature indicators changed color in 1, 2, 3, 4, and 5 minutes respectively. In view of the above, the time deviating from the set temperature range can be specified by using the temperature traceable indicator according to the example.

REFERENCE SIGNS LIST 1 substrate
2 temperature indicator
3 time display area
4 2-dimensional code
5, 6, 7 thermo chromic ink
8, 9, 10 thermoconductive layer
11 initial state of first ink and second ink
12 color developed first ink and second ink
13 color of decolorized first ink and decolorized second ink
14 color developed first ink
15 decolorized second ink
16 color developed second ink
17 decolorized first ink
18, 19, 20 overlapped portion between the first ink and the second ink
21 temperature traceable indicator
22 commodity

The invention claimed is:

1. A temperature traceable indicator comprising a substrate, a plurality of temperature indicators that change color when the temperature deviates from a set temperature range,
wherein the plurality of temperature indicators are arranged on the substrate, and
temperatures at which the temperature indicators change color are within ±2° C. of each other, and different temperature indicators change color after different periods of time of temperature deviation from the set temperature range,
wherein each of the plurality of temperature indicators contains:
a first ink in which decoloring initiation temperature $T_{a1}$ upon temperature elevation and color development initiation temperature $T_{d1}$ upon temperature lowering are different; and
a second ink in which the decoloring initiation temperature $T_{a2}$ upon temperature elevation and color development initiation temperature upon temperature lowering $T_{d2}$ are different, and
the decoloring initiation temperature $T_{a1}$, the color development initiation temperature $T_{d1}$, the decoloring initiation temperature $T_{a2}$, and the color development initiation temperature $T_{d2}$ are in a relation: $T_{d1} < T_{d2} < T_{a1} < T_{a2}$.

2. The temperature traceable indicator according to claim 1,
wherein in an initial state in the temperature indicator the first ink has developed color and the second ink is decolorized and for a temperature T in the initial state the following inequality applies:

$T_{d2} < T < T_{a1}$, the first ink is decolorized when the temperature reaches or exceeds $T_{a1}$, and
the second ink develops color when the temperature reaches or falls below $T_{d2}$.

3. The temperature traceable indicator according to claim 1,
wherein the first ink and the second ink each contains a leuco dye, a color developer, and a decolorizer.

4. The temperature traceable indicator according to claim 3,
wherein the first ink and the second ink are encapsulated with resin membranes respectively.

5. The temperature traceable indicator according to claim 3,
wherein the decolorizer contained in the first ink and the second ink is different for each of the temperature indicators.

6. The temperature traceable indicator according to claim 1,
wherein each of the temperature indicators comprises an ink layer that changes color upon deviation from the set temperature range, a thermoconductive layer disposed between the ink layer and the substrate.

7. The temperature traceable indicator according to claim 6,
wherein the thermal conductivity of the thermoconductive layer is different for each of the temperature indicators.

8. The temperature traceable indicator according to claim 6,
wherein the thermoconductive layer is different in the thickness for each of the temperature indicators.

9. The temperature traceable indicator according to claim 1,
wherein a one-dimensional code or a two-dimensional code is provided on the substrate.

10. The temperature traceable indicator according to claim 9,
wherein the one-dimensional code or the two-dimensional code has any one of information of a number of the temperature indicators, positions of the temperature indicators, the set temperature ranges of the temperature indicators, and time from deviation from a set temperature to color change of the temperature indicators.

11. An article quality management method by using the temperature traceable indicator according to claim 1,
wherein in a distribution of an article the temperature traceable indicator is selected for use that has the time period of temperature deviation from the set temperature range for obtaining color change corresponding to each of the processes in article distribution, and
deviation from the set temperature range is judged in each of the processes based on the presence or absence of the color change of the temperature traceable indicators.

12. An article quality management method using the temperature traceable indicator according to claim 9,
wherein in a distribution of an article the temperature traceable indicator is selected for use that has the time period of temperature deviation from the set temperature range for obtaining color change corresponding to each of the processes in article distribution,
the one-dimensional code or the two-dimensional code is read by a reading device,
presence or absence of the color change in the temperature indicator is recognized based on the data with respect to the temperature indicator obtained from the read code, and
deviation from the set temperature range or is judged in each of the processes based on the presence or absence of the color change of the temperature indicator.

13. The article quality management method according to claim 11,
wherein the color change of the temperature indicator is taken by a camera as image data or color gradation data.

* * * * *